United States Patent
Zhang

(10) Patent No.: US 11,572,966 B2
(45) Date of Patent: Feb. 7, 2023

(54) DUAL ELASTIC HOSE

(71) Applicant: Feibiao Zhang, Hangzhou (CN)

(72) Inventor: Feibiao Zhang, Hangzhou (CN)

( * ) Notice: Subject to any disclaimer, the term of this patent is extended or adjusted under 35 U.S.C. 154(b) by 37 days.

(21) Appl. No.: 16/231,691

(22) Filed: Dec. 24, 2018

(65) Prior Publication Data

US 2020/0200300 A1   Jun. 25, 2020
US 2022/0356965 A9   Nov. 10, 2022

(30) Foreign Application Priority Data

Nov. 20, 2018   (CN) .......................... 201821915260.1

(51) Int. Cl.
*F16L 11/00*   (2006.01)
*F16L 11/04*   (2006.01)

(52) U.S. Cl.
CPC ...................................... *F16L 11/04* (2013.01)

(58) Field of Classification Search
CPC ....................................................... F16L 11/04
USPC ......................................... 138/109, 124, 126
See application file for complete search history.

(56) References Cited

U.S. PATENT DOCUMENTS

| | | | | | |
|---|---|---|---|---|---|
| 652,299 | A * | 6/1900 | Smith | ................... | B29D 23/001 138/126 |
| 2,114,274 | A * | 4/1938 | Huppert | ................... | D04C 1/02 87/7 |
| 2,393,496 | A * | 1/1946 | Stedman | ............... | B29D 23/001 138/126 |
| 2,852,216 | A * | 9/1958 | Peters | .................... | B64D 39/02 244/135 A |
| 4,013,101 | A * | 3/1977 | Logan | .................. | B29D 23/001 138/130 |
| 4,357,962 | A * | 11/1982 | Shaw | ...................... | F16L 9/121 138/124 |
| 4,576,205 | A * | 3/1986 | Morinaga | ........... | F16L 55/1656 138/124 |
| 4,777,859 | A * | 10/1988 | Plummer, Jr. | ...... | B29C 61/0658 87/7 |

(Continued)

*Primary Examiner* — James F Hook
(74) *Attorney, Agent, or Firm* — Zhihua Han

(57) ABSTRACT

A highly extendable and retractable dual elastic hose comprises a tubular inner fluid conduit made of an elastomeric material and an elastic tubular outer sleeve of interwoven webbing made out of braided strands of textile yarns wherein embedded a plurality of evenly distributed highly elastic rubber strings extending horizontally along its longitudinal length. The inner tube is secured to the tubular outer sleeve only at an inlet coupler and an outlet coupler. Both the inner tube member and the outer tube sleeve can automatically expand longitudinally up to five times its unexpanded or contracted length resulting from pressurized fluid within the hose. To provide a linearly extendable and retractable dual elastic hose constructed with elastic materials both in the inner tube and the outer sleeve, it shows advantages of an improvement in expandable ratio of the outer sleeve and a reduction of strain forces required for the inner elastic tube to elongate the outer sleeve. A prolonged service life of the dual elastic hose is expected due to an effective reduction of frictional contacts and frictional resistance between the internal wall of the outer sleeve and the outer wall of the inner tube from less relative movements a lubricant layer between the two walls.

7 Claims, 4 Drawing Sheets

(56) References Cited

U.S. PATENT DOCUMENTS

| | | | |
|---|---|---|---|
| 5,346,731 A * | 9/1994 | Nakanishi | D02G 3/48 428/34.5 |
| 5,607,736 A * | 3/1997 | Williams | B62J 7/08 428/36.3 |
| 6,148,865 A * | 11/2000 | Head | B29C 70/222 138/123 |
| 8,272,407 B2 * | 9/2012 | Soyland | B05B 5/1608 138/109 |
| 8,291,941 B1 | 10/2012 | Berardi | |
| 8,291,942 B2 | 10/2012 | Berardi | |
| 8,479,776 B2 | 7/2013 | Berardi | |
| 2008/0072985 A1 * | 3/2008 | Burrowes | F16L 11/081 138/126 |
| 2018/0259096 A1 | 9/2018 | Ragner | |

\* cited by examiner

DUAL ELASTIC HOSE

CROSS REFERENCE TO RELATED APPLICATION

This application claims priority to C.N. application Ser. No. 2018219152601 entitled "Highly Elastic Extendable Hose", filed on Nov. 20, 2018, which is hereby incorporated by reference in its entirety.

FIELD OF THE INVENTION

The field of this invention relates to hoses or tubular conduits for use in the transfer of pressurized fluids, such as water. More particularly, the invention relates to linearly extendable and retractable dual elastic hoses comprising coaxially positioned an inner tube and an outer sleeve, both with high elasticity.

BACKGROUND OF THE INVENTION

Hoses are popular tools with homeowners for transporting water from a conventional household spigot to where it is needed. It is necessary in some circumstances to move the hoses around while operating them to spray water for the purposes of car washing, housekeeping or garden watering etc. After they are used conventional hoses are normally carried or dragged back to their place of storage and they are stored on a reel or coiled up upon themselves and laid on a flat surface. Long hoses may be heavy and cumbersome to manipulate and put through for many users and they present some storage issues like kinks and knots with conventional reels and hooks arrangements.

It is known in the art that extendable and retractable hoses can provide certain benefits, namely their lightness in weight and convenience in use, relative to conventional fixed length ones. However, they are also associated with some drawbacks particularly when the extending and retracting forces are initiated solely by the expansion or relaxation of the inner elastic tube upon the pressure of water or the release of water pressure within the hose. For example, prior art extendable and retractable hoses often use friction resistant woven fabric jacket to protect the inner elastic tube from abrasive damages on rough surfaces like concrete, asphalt, and brick. The conventional reinforcement jackets adopted to provide structural supports are made of non-elastic based materials which inevitably constrain in a process of conducting a longitudinal extension to potential limits of the hoses with regard to the extension limit of the elastic inner tube. Another problem with a non-elastic reinforcement jacket housing an elastic inner tube as configured in conventional extendable hoses lies in the universal existence of frictional contacts and accordingly introduced frictional resistance between the internal wall of the outer jacket and the outer wall of the inner tube during stretching, elongating and retracting of the hose.

The second problem can be partially mitigated by applying a lubricant between the inner elastic tube and the non-elastic reinforcement jacket to lower frictional resistance and lessen wear at the inner elastic tube when frictional contacts occur and therefore partially reduce damages to the exterior of the inner tube and promote a longer service life of the extendable hose. However, there is still a need in the art for a novice hose concept, preferably one which uses solely an elastic inner tube to provide extending forces, to address the aforementioned problems such as, the longitudinal extension limitation of a hose resulting from non-elasticity of a reinforcement fabric jacket and the friction induced hose failure due to inevitable and universal existence of frictional contacts between an inner elastic tube and a reinforcement jacket.

OBJECT AND SUMMARY OF THE INVENTION

In the present disclosure, a dual elastic hose with coaxially positioned an elastic inner tube and an elastic outer sleeve is presented which solve problems with existing extendable hoses. The dual elastic hose can simultaneously and dually extend longitudinally upon the application of a fluid pressure within the hose and as well retract automatically upon release of the fluid pressure within the hose. The highly extendable and retractable hose, with both the inner tube and the outer tubular sleeve being elastic, can automatically expand longitudinally up to five times its unexpanded or contracted length resulting from pressurized fluid tension within the hose. It comprises a tubular inner fluid conduit made of an elastomeric material and a tubular elastic outer sleeve of an interwoven webbing made out of braided strands of textile filaments wherein embedded a plurality of evenly distributed highly elastic rubber strings in an interval manner extending horizontally along the longitudinal length of the outer sleeve. The elastic outer sleeve is coaxially positioned around the outer circumference and the length of the elastic inner tube and is secured to the elastic inner tube only at the first end and the second end of the inner tube by an inlet coupler and an outlet coupler, respectively. The elastic outer sleeve is free of constraints from the elastic inner tube between positions of the inlet coupler and the outlet coupler, by which we mean the elastic outer sleeve is unattached, unconnected, unbonded and unsecured to the elastic inner tube along the entire length of the inner tube between the first end and the second end and is able to expand and contract freely with respect to the elastic inner tube along the entire length of the inner tube between the first end and the second end.

To provide a solution to existing problems as set forth above, a longitudinally extendable and retractable dual elastic hose constructed with elastic materials for both the inner tube and the outer sleeve shows advantages of an improvement in elongation ratio of the outer sleeve and a reduction of strain forces within the inner tube, which is solely required to elongate the outer sleeve of high elasticity due to an arrangement of a plurality of rubber strings evenly embedded along the longitudinal side of the webbing of interwoven strands of fabric which is configured to be a formation of the outer sleeve. Meanwhile, with the adoption of elastic rubber strings in the construction of the outer sleeve, a significant reduction of relative movements and hence frictional contacts is realized between the internal wall surface of the outer sleeve and the outer wall surface of the inner tube. Therefore, a prolonged service life of the dual elastic hose is expected due to an effective reduction of frictional contacts between the internal wall of the outer sleeve and the outer wall of the inner tube together with a decreased strain force requirement on the inner tube to initiate elongating and retracting of the hose.

Accordingly, it is an objective for the present invention to provide a highly extendable hose that comprises an elastic inner tube and an elastic outer sleeve. The dual elastic hose presents a prolonged service life for both the inner tube and the outer sleeve due to less strain required to elongate the hose as a result of an increased extendable ratio of the outer sleeve and a significantly reduced probability of frictional contacts between the out wall of the inner fluid conduit and the inner wall of the outer sleeve when the dual hose components simultaneously expand longitudinally upon the application of a fluid pressure within the hose and automatically dual retract upon the release of the pressure. The elastic outer sleeve is fabricated into a braided interwoven structure of braided strands of yarns wherein embedded a plurality of highly elastic and evenly spaced rubber strings distributed among the circumference of the sleeve tube extending horizontally along its longitudinal direction.

It is an additional objective of the present invention to provide a dual elastic hose with an elastic outer sleeve made by a zipper type weaving process.

It is a further objective of the present invention to provide an elastic outer sleeve wherein circumferentially embedded a plurality of rubber strings extending horizontally along its longitudinal side in an evenly distributed interval manner.

It is yet another objective of the present invention to provide a dual elastic hose with a lubrication layer implemented on the outer wall surface of the elastic inner tube and the choice of the lubrication material may be industrial lubricants.

It is a still further objective of the present invention to provide a dual elastic hose with an inner tube made of elastic materials which may be thermoplastic elastomer (TPE) and latex.

It is a still further objective of the present invention to provide a dual elastic hose that the inner tube longitudinally extends 2~5 times of its relaxed or unexpanded length.

In the present disclosure, a unique design of a dual elastic (inner tube and outer sleeve) extendable hose is presented, which solves problems with existing expandable hoses. The elastic outer sleeve concept is realized by embedding longitudinally within the interwoven braided webbing structure of the outer sleeve a plurality of evenly distributed highly elastic rubber strings, and it effectuates a minimum frictional wear between the extendable and retractable dual elastic inner and outer tubes with this configuration. Besides, a greatly improved overall elongation ratio with regard to the same subject of the conventional expandable hoses is also beneficial to hose users. In the meantime, an elastic outer sleeve extends the service life of the inner tube because in a scenario of a conventional extendable hose which is configured to rely solely on the inner tube thereof to provide an extending and retracting force, the inner tube is required to undergo considerably significant expansion to sustain the tension needed to initiate the overall extending or retracting movements of the hose. However, with an elastic outer sleeve, as disclosed in the present invention, which is coaxially positioned around the outer circumference and the length of the elastic inner tube and is secured to the elastic inner tube only at the first end and the second end of the inner tube, tension needed for the inner tube to extend the hose is reduced because the elastic outer sleeve is capable of undergoing automatic extending with less requisition of dragging force due to inherent elasticity of embedded rubber strings. On the other side, the elastic outer sleeve is able to retract automatically and instinctively with minimum reliance on pulling force offered by an effect of the inner tube retraction upon the release of pressure within the elastic inner tube. The reduced force requirements of pulling and dragging to initiate hose movements decrease stress and strain upon the inner elastic tube which is involved in a repetition of longitudinal extending and retracting during service processes, and impact in a significantly favorable way to support an overall longer hose service life. Besides, frictional contacts between the internal wall of the outer sleeve and the outer wall of the inner tube are greatly reduced, which also contributes to a longer lifespan of the hose. These improvements comprise not only improvements to the hose outer sleeve, but also the hose designs that are easier to manufacture.

BRIEF DESCRIPTION OF THE DRAWINGS

Other objectives and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objectives and features thereof.

DETAILED DESCRIPTION OF THE INVENTION

The objectives, aspects and advantages of the present invention are more apparent from the following detailed description, particularly when considered in conjunction with the accompanying drawings. However, it should be comprehended that the following detailed description of preferred embodiments are used solely for the purpose of further explanation of rather than providing any limitation to the present invention.

Figure 1:
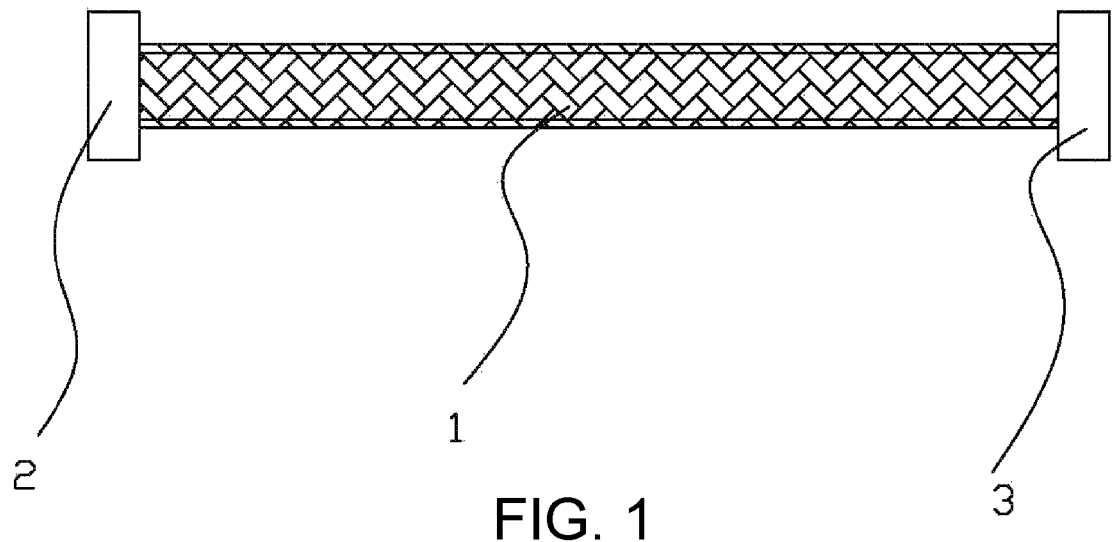
FIG. 1 is a schematic diagram of a dual elastic hose with an inlet and an outlet coupler.

FIGS. 1-5 illustrate the present invention and the manner in which it is assembled. A dual highly elastic hose as shown in FIG. 1 comprises a hose body 1 which has a first end and a second end, and a set of connectors positioned respectively at the first end as an outlet connector 2 and the second end as an inlet connector 3. The hose body 1 includes an elastic inner tube and an elastic outer sleeve and the latter is made by a zipper type weaving process.

Figure 2:
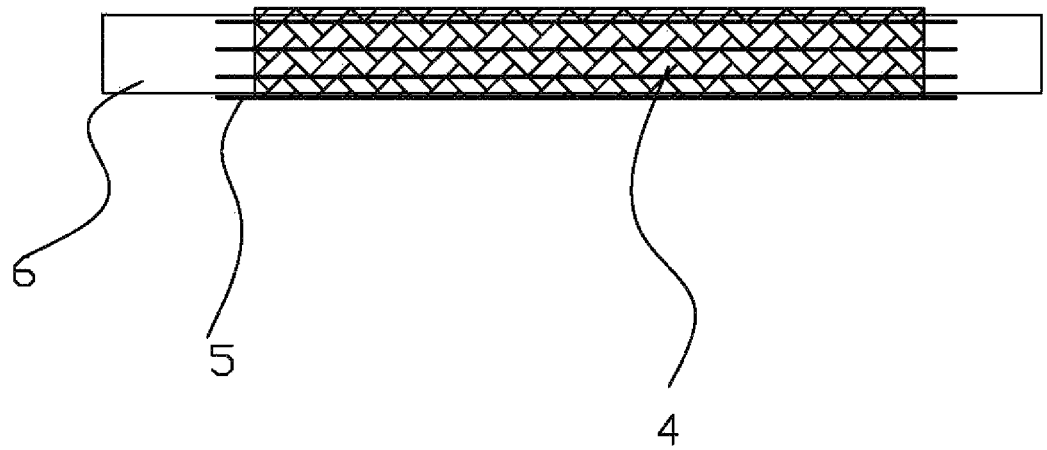
FIG. 2 is a structural diagram of a duel elastic hose with an elastic inner tube and an elastic outer sleeve.

FIG. 2 is a schematic section view of an exemplary dual elastic hose disclosed in the present invention. The hose body 1 is composed of two separate and distinct members, an inner tube 6 formed form a thermoplastic elastomer (TPE) material or latex the like material which can extend 2 to 5 times of its relaxed or unexpanded length, and an outer sleeve 4 formed from a braided interwoven fabric webbing wherein embedded longitudinally a plurality of rubber strings 5. Those rubber strings are implanted within the braided fabric webbing during a weaving process. As demonstrated in FIG. 2, rubber strings 5 are embedded within the sleeve horizontally along its longitudinal side in an interval manner evenly distributed among the circumference of the sleeve. Besides its advantageous friction resistance against rough surfaces, which provides the inner tube with fray protection, the outer sleeve exhibits elasticity induced tensile property that reduces the required strain force from the inner tube to expand or retract the hose in a synergistic interaction. It is easy to understand that the larger number of rubber strings employed and embedded, the better the tensile property the hose possesses.

The aforementioned elastic inner tube 6 further comprises a layer of lubricant on the surface of its outer wall. The material choice of the lubricant is not limited to and may include industrial lubricants. The adoption of lubricants on the outer wall of the inner tube 6 not only further reduces friction between the inner tube and the outer sleeve therefore extends the service lifespan of the hose but also provides benefits during manufacture of the hose by allowing the outer sleeve to be fitted around the inner tube with less frictional resistance.

The present invention discloses multiply types of hose connectors that can be attached to the first end and the second end of the dual elastic hose including but not limited to the followings: quick connectors, treaded connectors and press-fit connectors.

Figure 3:
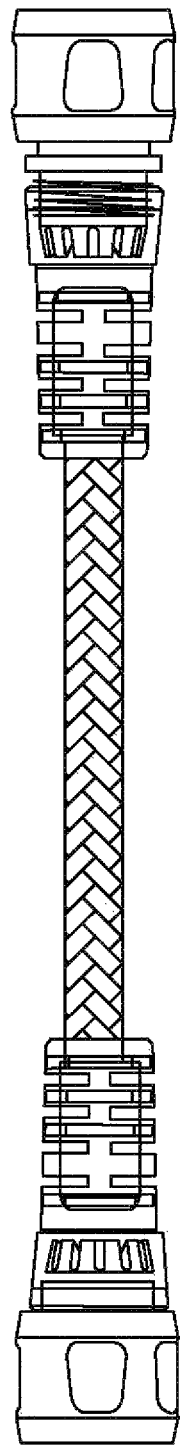
FIG. 3 is a longitudinal side view of the present invention assembled with a set of quick connectors.

The present invention as shown in FIG. 3 provides a dual elastic hose that includes an elastic outer sleeve wherein embedded a plurality of rubber strings within its interwoven webbing structure is coupled with a pair of quick connectors. Besides the anti-friction protection from the outer sleeve, this embodiment provides the dual elastic hose with an improved tensile property due to implanted rubber strings in the outer sleeve and offers a prototype assembly for easy and quick hose connecting.

Figure 4:
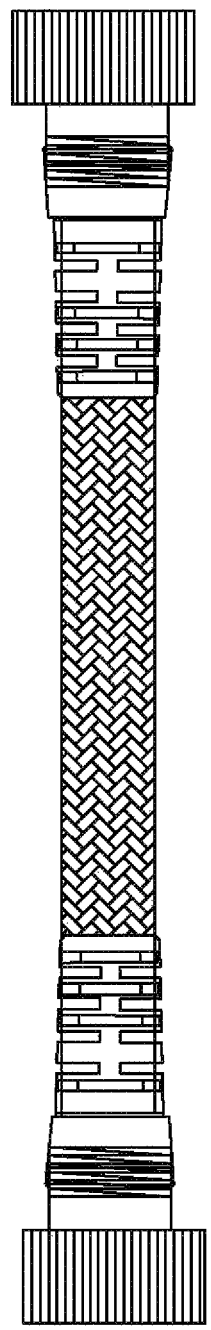
FIG. 4 is a longitudinal side view of the present invention assembled with a set of threaded connectors.

The present invention as shown in FIG. 4 provides a dual elastic hose with an elastic outer sleeve wherein embedded a plurality of rubber strings within its interwoven webbing structure is coupled with a pair of treaded connectors. In this example, the coupling with the connectors on each side of the hose with the inlet or outlet end thereof, adopts respectively a treaded connection which is widely applicable to assembly with most of the existing extendable hoses. Besides the anti-friction protection from the outer sleeve, this embodiment provides the dual elastic hose with an improved tensile property due to implanted rubber strings in the outer sleeve and offers an easy and convenient alternative for hose assembly.

Figure 5:
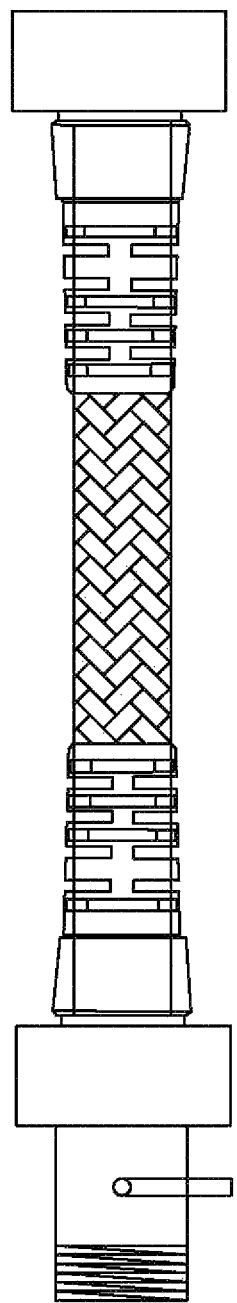
FIG. 5 is a longitudinal side view of the present invention assembled with a set of adapter connectors.

The present invention as shown in FIG. 5 provides a dual elastic hose with an elastic outer sleeve wherein embedded a plurality of rubber strings within its interwoven webbing structure is coupled with a pair of adapter connectors. The adapter connector is capable of being used as an intermediate adapter to facilitate further assembly with add-on extendable hoses for the purpose of lengthening the unit. Besides the anti-friction protection from the outer sleeve, this embodiment provides the dual elastic hose with an improved tensile property due to implanted rubber strings in the outer sleeve and offers a facile and versatile mode for a variety of possibilities in hose assemblies.

The present invention provides a novel concept of a highly extendable hose with coaxially arranged dual elastic tubular configurations for fluid transporting purposes and prototypes of assemblies on both ends thereof with inlet and outlet connectors, respectively. The outer tubular sleeve of present invention dramatically increases extendibility through longitudinally implanting within the braided woven structure of its sleeve webbing a plurality of rubber strings that promote tensile property, and at the same time provides the inner elastic tube with a tough protection against frictional wear over rough surfaces as a conventional reinforcement jacket does. Besides, the elasticity of the tubular outer sleeve facilitates the expanding and retracting movements of the hose in a better synergistic interaction by reducing strain or stress upon the elastic inner tube necessary for dragging and pulling when the outer sleeve elastically expands longitudinally upon the application of a fluid pressure or automatically retracts upon the release of the pressure within the hose. As a matter of fact, the dual elastic hose of this invention needs relatively less force to realize a same length extension comparing with a similar subject for conventional counterparts. Moreover, the implementation of a layer of lubricant on surface of the outer wall of the elastic inner tube further reduces frictional resistance from conceivably minimized frictional contacts between the inner tube and the outer sleeve and therefore extends the lifespan of the hose and benefits users in a favorable economical way.

Although certain preferred embodiments have been specifically described as above mentioned, it must be recognized that they are not limitations of this utility invention and various changes, alternatives, or modifications may be made or chosen without departing from the spirit and scope of the invention and therefore should be covered by the present invention.

The invention claimed is:

1. A hose comprising:
   an elastic tubular inner fluid conduit made of an elastomeric material;
   an elastic tubular outer sleeve being a tubular interwoven webbing made out of braided strands of textile filaments wherein a plurality of elastic rubber strings are implanted within the tubular interwoven webbing; and
   an inlet coupler and an outlet coupler;
   whereby said tubular inner fluid conduit is substantially hollow within its circumference of a tubular conduit wall and has a first end and a second end in its tubular length; and
   said tubular outer sleeve is substantially hollow within its circumference of a tubular interwoven webbing wall and has a first end and second end in its tubular interwoven webbing length.

2. The hose of claim 1 wherein said plurality of highly elastic rubber strings are evenly distributed within said circumference of said tubular interwoven webbing wall of said tubular outer sleeve in an interval manner extending horizontally along said tubular interwoven webbing length of said tubular outer sleeve.

3. The hose of claim 1 wherein said tubular inner fluid conduit and said tubular outer sleeve are both elastic, and extend longitudinally up to five times their original length resulting from pressurized fluid tension within said hose.

4. The hose of claim 1 wherein said elastic tubular outer sleeve is coaxially positioned around the circumference of an outer surface of said tubular inner fluid conduit and along the length of the outer surface of said tubular inner fluid conduit and is secured to said elastic tubular inner fluid conduit only at said first end and said second end of said elastic tubular inner fluid conduit by said inlet coupler and said outlet coupler.

5. The hose of claim 1 wherein said elastic tubular outer sleeve is unattached, unconnected, unbonded and unsecured to said elastic tubular inner fluid conduit along an entire length of said elastic tubular inner fluid conduit between said first end and said second end thereof; and said elastic tubular outer sleeve is able to extend and retract freely with respect to said elastic tubular inner fluid conduit along the entire length of said inner fluid conduit between said first end and said second end thereof.

6. The hose of claim 1 wherein said elastic tubular outer sleeve is made by a weaving procedure which may be a zipper type weaving process.

7. The hose of claim 1 wherein a lubrication layer is applied on its outer surface of said tubular wall of said elastic tubular inner fluid conduit and material choices of said lubrication layer may be industrial lubricants.

* * * * *